US008738071B2

(12) United States Patent
Wohld (10) Patent No.: US 8,738,071 B2
(45) Date of Patent: May 27, 2014

(54) LOCATION BASED IDLE MOBILE FREQUENCY SELECTION

(75) Inventor: Adam Harold Wohld, Saint Charles, IL (US)

(73) Assignee: Cellco Partnership, Basking Ridge, NJ (US)

( * ) Notice: Subject to any disclaimer, the term of this patent is extended or adjusted under 35 U.S.C. 154(b) by 236 days.

(21) Appl. No.: 12/958,936

(22) Filed: Dec. 2, 2010

(65) Prior Publication Data

US 2012/0142343 A1 Jun. 7, 2012

(51) Int. Cl.
*H04M 1/00* (2006.01)

(52) U.S. Cl.
USPC ............... 455/550.1; 455/418; 455/432.1; 455/435.2; 455/435.3; 455/436; 455/456.1; 455/457; 455/558; 370/310.2; 370/328; 370/338

(58) Field of Classification Search
USPC ............... 455/418, 432.1, 435.2, 435.3, 436, 455/456.1–457, 550.1, 558; 370/310.2, 370/328, 338
See application file for complete search history.

(56) References Cited

U.S. PATENT DOCUMENTS

| 5,235,633 | A | 8/1993 | Dennison et al. |
| 5,546,445 | A | 8/1996 | Dennison et al. |
| 5,732,354 | A * | 3/1998 | MacDonald ............... 455/456.2 |
| 6,138,003 | A | 10/2000 | Kingdon et al. |
| 6,246,861 | B1 * | 6/2001 | Messier et al. ............... 455/12.1 |
| 6,324,404 | B1 | 11/2001 | Dennison et al. |
| 6,362,783 | B1 * | 3/2002 | Sugiura et al. ............... 342/457 |
| 6,677,894 | B2 | 1/2004 | Sheynblat et al. |
| 6,714,789 | B1 * | 3/2004 | Oh et al. ..................... 455/456.1 |
| 6,839,560 | B1 * | 1/2005 | Bahl et al. .................. 455/456.1 |
| 6,954,649 | B2 * | 10/2005 | Kotzin ....................... 455/456.1 |
| 7,437,158 | B2 * | 10/2008 | Russell ....................... 455/435.2 |
| 7,768,976 | B2 * | 8/2010 | Burgess ....................... 370/331 |
| 2005/0075114 | A1 | 4/2005 | Dennison et al. |
| 2006/0105778 | A1 | 5/2006 | Wiederspahn |

* cited by examiner

*Primary Examiner* — Steve D Agosta (57) ABSTRACT

A mobile network sector is served via at least an antenna and a mobile network base station transceiver to provide communications with a mobile station. The mobile station includes a mobile station antenna and a location determination device for identifying a geographic location of the mobile station. A transceiver in the mobile station is configured to transmit and receive signals to and from the mobile network base stations, via the mobile station antenna. A microprocessor controls the transmission and reception of the mobile communication signals and communicates with the location determination device. A spatial database identifies geographic positions related to sectors of mobile network base stations. The microprocessor compares the geographical location of the mobile station with the geographic positions of the mobile sectors to determine a preferred mobile network sector and redirect the transceiver to tune to a particular channel supported by the preferred mobile network sector.

18 Claims, 7 Drawing Sheets

LOCATION BASED IDLE MOBILE FREQUENCY SELECTION

TECHNICAL FIELD

The present subject matter relates to techniques and equipment in the general art of cellular telephone or other mobile device technology, and to the particular field of managing the frequency selection for a mobile device, for example, when the device is in an idle state.

BACKGROUND

As mobile station users travel with their devices (e.g. mobile phones, mobile computers, and mobile broadband modems), a number of processes must take place to assure continuous service. One of the processes is an idle redirection between channels (i.e. frequencies). Channel redirection is used to increase the mobile network's performance by distributing the use of bandwidth over different frequencies. Channel redirection is also needed to try to avoid co-channel interference among nearby base stations or antennas.

The current frequency selection methodology sends a message from a base station over that particular sector's channel that tells all mobile stations on that particular channel to retune to a different specific channel. Any mobile station that receives the message is redirected. There are many disadvantages to the current scheme. One is that the area that needs to be redirected is only roughly controlled by radio frequency ("RF"). Not all mobile stations within the sector need the redirection signal.

Additionally, on border areas, only mobiles in part of a coverage area need to be redirected to the new channel. The mobile stations that do not need to be redirected are taking up bandwidth on the new channel and are leaving a channel that could be partly used. This underutilizes some sector-channels and over-utilizes others and can impact the wireless capacity of the area serviced by that sector.

As noted above, a further difficulty with the existing redirection procedure is that mobile stations that need to acquire the signal to be redirected, may not receive the signal. Alternately, redirect signals from within the network leak into a border area that does not require redirection and those mobile stations are now set for redirection. Both of these scenarios also lead to a reduction in capacity on those sectors. Further, mobile stations that travel into an intended redirection area can miss the redirection message if the mobile station is idling on a sector-channel that is not transmitting the redirection message. This leads to the occurrence of dropped calls or failed call attempts.

Figure 1A:
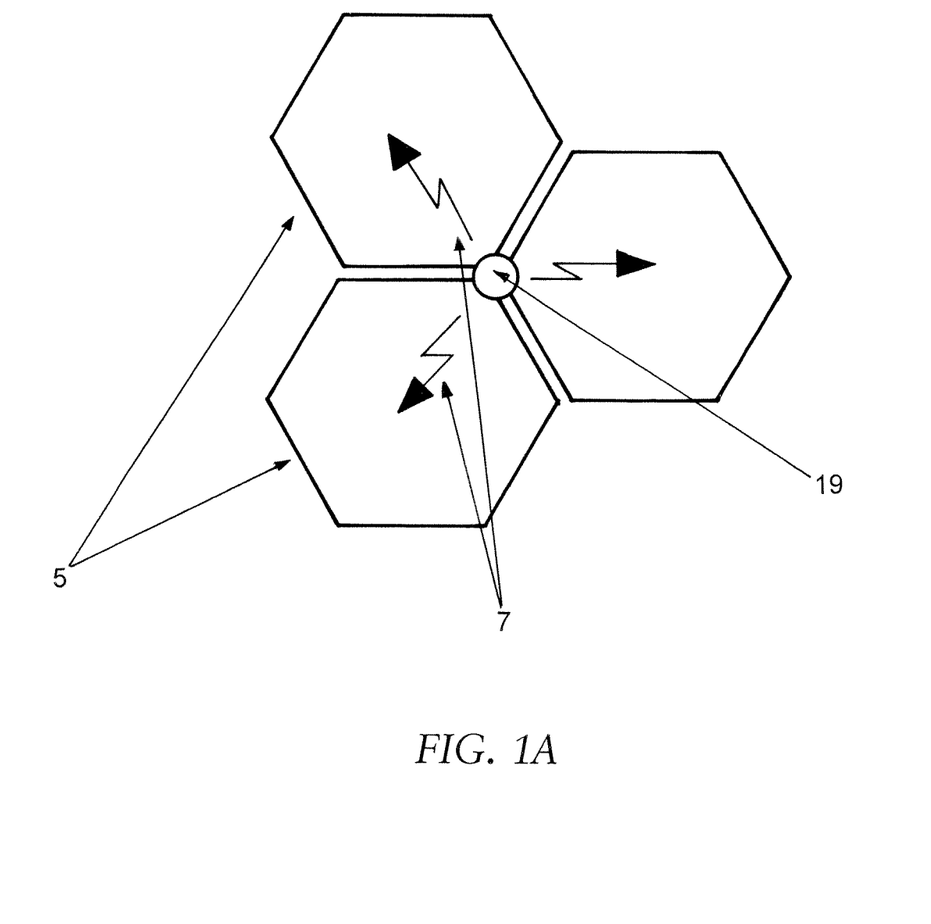
FIGS. 1A and 1B are functional block diagrams that depict various components of an exemplary mobile communications network.

Sector areas are limited by the channel (frequency) transmitted over RF. The sectors, at their most basic, are subdivisions of the transmission area of the base station antenna. FIG. 1A illustrates a base station 19 in the center of three sectors 5 transmitting redirect signals 7. So while a sector may be geographically determined it actually controlled by RF and RF is inherently difficult to control.

Hence, a need exists for a system that will allow mobile stations to properly place themselves on the proper frequency (channel) without the need to acquire or communicate with a mobile network system.

SUMMARY

The teachings herein alleviate one or more of the above noted problems by providing a device and method to allow a mobile station to tune to the proper frequency (channel).

A mobile network includes a number of base stations, and each base station serves a cellular area that often is divided into a number of sectors. Sectors, such as those of neighboring base stations, may overlap so that a mobile station communicating via a sector of one base station may also detect signals for a sector from the adjacent base station.

The mobile station includes a mobile station antenna and a location determination device for identifying a geographic location of the mobile station. A mobile transceiver is also included and is configured to transmit and receive mobile communication signals from the mobile network base stations via the mobile station antenna.

In the examples discussed in detail below, a microprocessor controls the transmission and reception of the mobile communication signals and communicates with the location determination device. Further, a spatial database identifies geographic positions related to the mobile network sectors. The microprocessor compares a determined geographical location of the mobile station with the geographic positions of the mobile network sectors to determine a preferred mobile network sector and with which channel to communicate on. The microprocessor then tunes a mobile station transmitter to a predefined channel handled by the selected mobile network sector.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to performing one or more queries to determine what sector and/or channel the mobile station should acquire based on its geographic location.

Figure 1B:
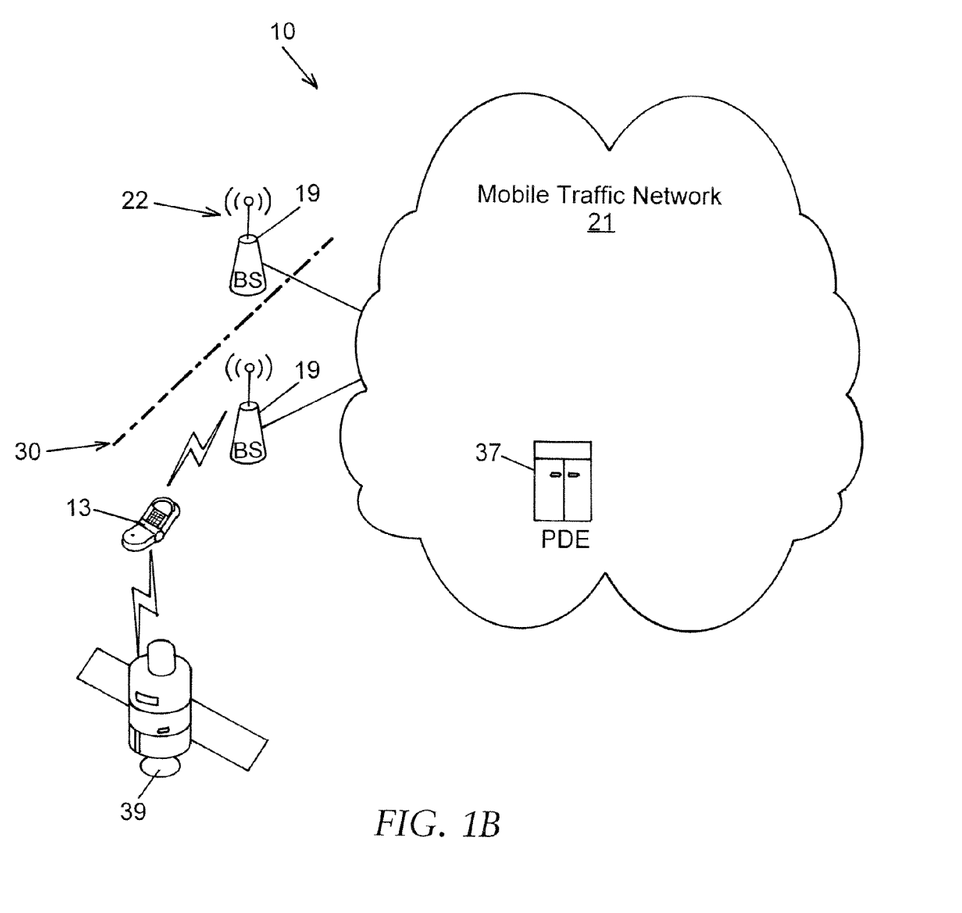

Reference now is made in detail to the examples illustrated in the accompanying drawings and discussed below. FIG. 1B illustrates a mobile communication network 10 as may be operated by a carrier or service provider to provide a wide range of mobile communication services and ancillary services or features to its subscriber customers and associated mobile station (MS) users. The elements indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations outside the mobile communication network 10.

The wireless mobile communication network 10 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile station 13 may be capable of conventional voice telephone communications and data communications. A variety of different types of mobile stations supporting such communications are widely available. Today, mobile stations typically take the form of portable handsets, smart-phones or personal digital assistants, although they may be implemented in other form factors.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile station 13 will typically include one or more RANs and a regional circuit and/or packet switched network and associated signaling network facilities.

Physical elements of a RAN operated by one of the mobile service providers or carriers, include a number of base stations represented in the example by the base stations (BS) 19. Although not separately shown, such a base station 19 typically includes a base transceiver system (BTS) which communicates via an antennae system at the site of base station and over the airlink with one or more of the mobile stations 13, when the mobile stations are within range. Each base station typically includes one or more BTSs coupled to several antennae mounted on a radio tower within a coverage area often referred to as a "cell." The BTS is the part of the radio network that sends and receives radio frequency ("RF") signals to/from the mobile station 13 that the base station 19 currently serves.

As shown in FIG. 1A, boundary line 30 illustrates a division between different mobile network sectors 7. The boundary line 30 can divide sectors of a network owned by different companies or by the same company having disjointed frequencies. For example, Verizon Wireless uses a frequency of 1900 MHz in Wisconsin and a frequency of 850 MHz in Illinois.

The equipment for providing wireless mobile communications for mobile stations in a cell area includes at least one base station 19, which may be located near the center of the cell. Each cellular coverage area may be divided into two or more sectors. In the example of FIG. 1A, the cell is divided into three sectors 5. Hence, the base station 19 would include BTSs (not separately shown) that are responsible for carrying out radio communications between the network 10 and any mobile stations operating within the respective areas of the three sectors. The area served by each BTS usually covers a single 120° sector of a cell. As a result, a three sector-three BTS base station 19 is able to accommodate all 360° around the base station site. However, it is understood that that depending on various factors, such as geography or user demand in a cell, the cell may be divided into one or two or more sectors (and may have one or two or more BTSs), or a cell may have more than three BTSs with redundant sector coverage.

In addition, the radio access networks also include a traffic network represented generally by the cloud at 21, which carries the user communications for the mobile stations 13 between the base stations and other elements with or through which the mobile stations communicate. In some examples, the mobile traffic network 21 includes a position determining entity (PDE) 37.

Each mobile station 13 can make a geographic location determination, in which the mobile station 13 takes measurements of signals from a number of GPS satellites 39 and processes those measurements so as to determine the latitude and longitude (and possibly altitude) of the current location of the mobile station 13.

Note that in some examples, the mobile station 13 does not need to communicate with a PDE 37 or any other element of the network 10 to make the proper determination. Thus, in an example, the mobile station 13 does not connect to the mobile communication network 10 to determine the redirected channel.

In other examples, the PDE 37 functions as a network element that manages the position or geographic location determination of each mobile station 13. The exemplary network 10 utilizes an assisted GPS approach to the determination of mobile station location, in which the mobile station 13 takes measurements of signals from a number of GPS satellites 39 and interacts with the PDE 37 to process those measurements so as to determine the latitude and longitude (and possibly altitude) of the current location of the mobile station 13.

Figure 2:
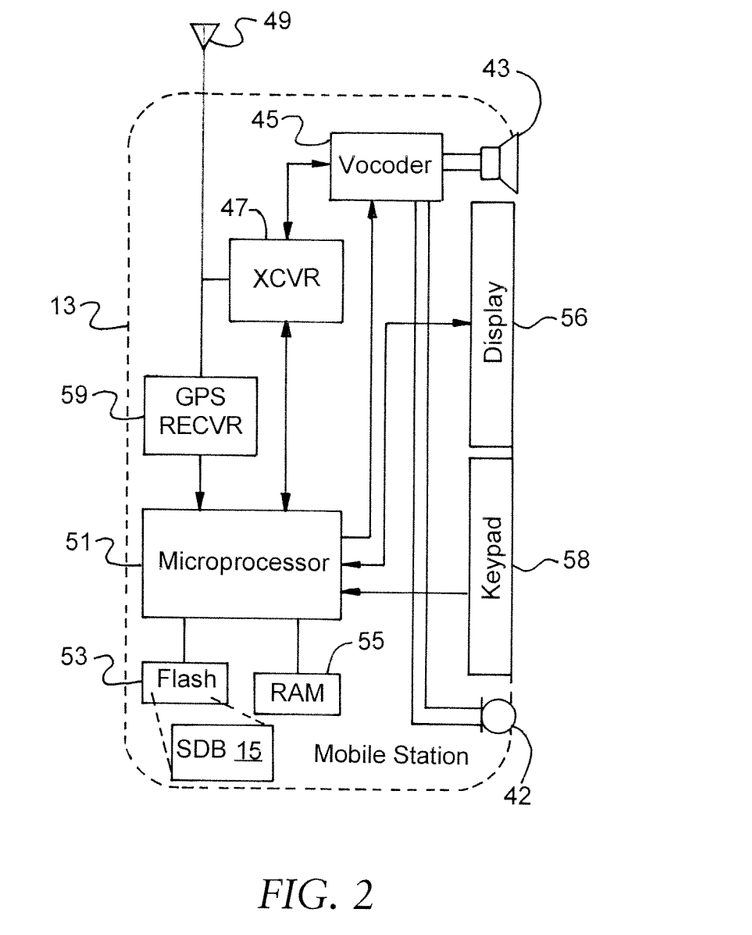
FIG. 2 is a simplified functional block diagram of a mobile station.

With reference to FIG. 2 a block diagram illustrating a GPS enabled mobile station 13 is shown and described. Although the mobile station 13 may be incorporated into a vehicle mounted mobile unit or into another device, such as a portable personal computer or PDA, for discussion purposes the illustration shows the mobile station 13 in the form of a handset. The handset embodiment of the mobile station 13 functions as a digital wireless telephone station. For that function, the station 13 includes a microphone 42 for audio signal input and a speaker 43 for audio signal output. The microphone 42 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13 also includes a digital transceiver (XCVR) 47. The concepts discussed here encompass examples of the mobile station 13 utilizing any digital transceivers that conform to current or future developed digital wireless communication standards. For example, the transceiver 47 could be a TDMA or GSM unit designed for cellular or PCS operation. In the present embodiments, the digital transceiver 47 is a CDMA transceiver compatible with operation via an IS-95 network or a 1x network, to provide both voice and packet data communications. Also, the mobile station 13 may utilize either or both of 3GPP2 (1XRTT and EVDO) technologies and 3GPP (LTE/GSM/UMTS) technologies. In other Multimode transceivers also may be used.

The transceiver 47 provides two-way wireless communication of information, such as vocoded speech samples and/or digital message information. The transceiver 47 also sends and receives a variety of signaling messages in support of the various services provided via the mobile station 13 and the network 10. Communications via the transceiver 47 and the antenna 49 may include various messages related acquisition assistance, position determination and related location based services. The transceiver 47 connects through RF send and receive amplifiers (not separately shown) to an antenna 49. In the example, the transceiver 47 is configured for RF communication in accord with a digital wireless protocol. The mobile station 13 may include one or more additional transceivers, for example, for operation in an analog mode or in accord with an alternative digital standard.

A microprocessor 51 serves as the programmable controller in that it controls all operations of the mobile station 13 in accord with programming that it executes. The mobile station 13 also includes flash type program memory 53 and/or a non-volatile random access memory (RAM) 55, for storing various software routines and mobile configuration settings, such as mobile identification number (MIN), etc. In a present implementation, the flash type program memory 55 stores an operating system, device driver software, call processing software and vocoder control software; and the memory may store any of a wide variety of other applications, such as client browser software and short message service software.

As shown, the mobile station 13 includes a display 56 for displaying messages, menus or the like, call related information dialed by the user, calling party numbers, etc. A keypad 58 enables dialing digits for voice and/or data calls and generating selection inputs keyed by the user based on any displayed menu. The display 56 and keypad 58 are the physical elements providing a textual or graphical user interface. In addition to normal telephone related input/output, these elements are also used for display of menus and other information to the user and user input of selections and for any other applications relating to determining position and providing ancillary position specific information. Of course other user interface elements may be used, such as a stylus and touch sensitive display screen, as in a PDA or mobile smartphone.

For position determination and associated location based services, the mobile station 13 also includes a location determination device 59, which for this example can be a GPS receiver 59. Under control of the microprocessor 51, the GPS receiver 59 receives and processes signals from one or more satellites of the constellation of GPS satellites 39. From its processing, the GPS receiver 59 supplies GPS data to the microprocessor 51, such as pseudorange measurements and associated PN codes for measured satellite signals. Associated computations may be performed in the microprocessor or by a processor or the like included in the GPS receiver 59.

As noted above, some examples do not require the mobile station 13 to connect to the network 10 before trying to acquire a signal/band frequency.

If the receiver 59 or the combination of the receiver and the microprocessor 51 are configured to provide a fully functional GPS position determination device, the station 13 could process the pseudorange measurements, absolute times of transmission of the GPS signals, and the satellite position data to compute the mobile station's latitude and longitude.

In other examples, because of size/space/cost constraints on the design of the mobile stations 13, the GPS receiver 59 in the mobile station 13 often will have only reception capability, not the full GPS processing capability to resolve position from signals received from the satellites 39. Hence, the receiver 59 supplies the GPS measurement and code data to the microprocessor 51, which in turn formats the data and sends it to the PDE 37 using the wireless transceiver 47. The PDE 37 performs the data processing necessary to determine the latitude and longitude of the station 13 and transmits that data where needed, which in some cases can be back to the mobile station 13 for further processing.

Additionally, there are other telemetric procedures that can determine the location of a radio frequency emitting and receiving device. The location determination device 59 can also use LORAN, Wireless Assisted GPS, Time Difference of Arrival (TDOA), Angle of Arrival (AOA), and any other device or method to determine the location of a radio frequency emitting and receiving device known to those of ordinary skill in the art.

In a typical mobile network, when the mobile station 13 is located within the sector 5, the user's mobile station 13 will stay tuned to the channel assigned to that sector until the mobile network station 19 sends a redirect signal 7. However, at the boundaries between sectors 30 mobile stations 13 that should redirect to a new channel may not get the signal 7 while others that should not redirect do get the signal. The present invention uses existing mobile station technology in a novel way to smoothly redirect a mobile station 13 from sector to sector and channel to channel.

Figure 3:
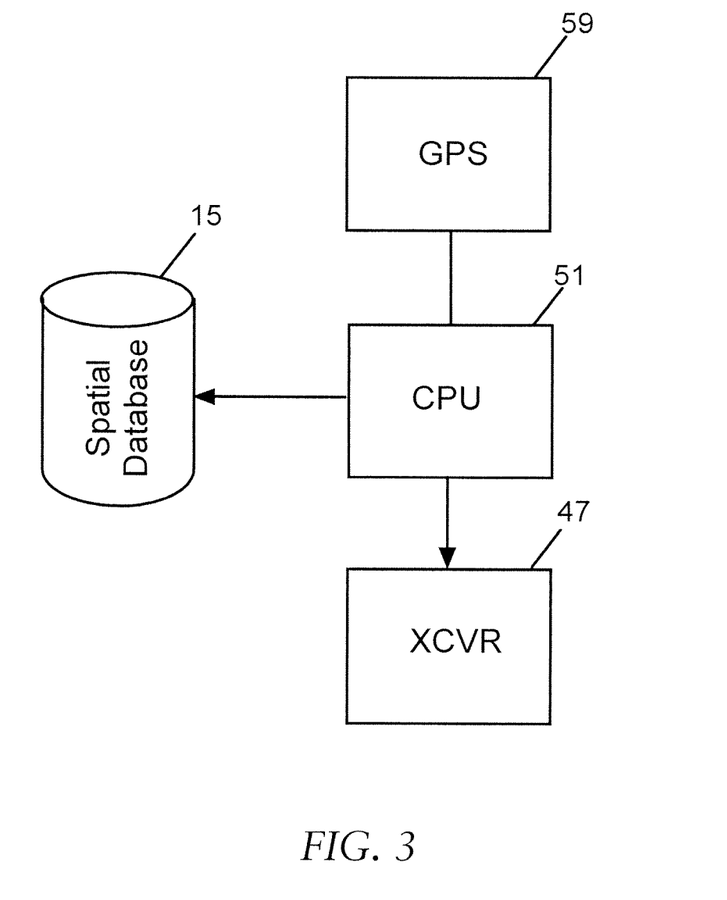
FIG. 3 is a simplified functional block diagram of the GPS, Microprocessor, Transceiver, Spatial Database combination.

FIGS. 2 and 3 illustrate a spatial database 15. The spatial database 15 can be loaded onto memory 53, 55, or a standalone memory device that can be permanent to the mobile station 13, or removable. The spatial database 15 can be pre-loaded in RAM 55 or loaded in flash 53, which can allow it to be updated. The spatial database contains a multiple of spatial polygons that denote what frequency to acquire for that polygon's geographic area. Additionally, the spatial database 15 can include all of the information above but for entire networks.

The "geographic location" or "geographic position" of the either the mobile station 13, the base stations 19 or the sector 5 can be represented as latitude and longitude, and/or altitude, other coordinates in any space or plane, or a single digit, or series of digits that are calculated based location. For example, a sector can be defined as a point or a series of points along the boundary line 30 or points within a boundary area formed by boundary line 30. Alternately, each base station 19, antenna, or sector 5 can be identified. A single geographic location can also be used and can be the location of a center or a centroid of the sector boundary 30 or the base station boundary. The conversion of telemetric data to a geographic location is known in the art, and the present invention contemplates all known methods to resolve a geographic location or position of an object.

Figure 4:
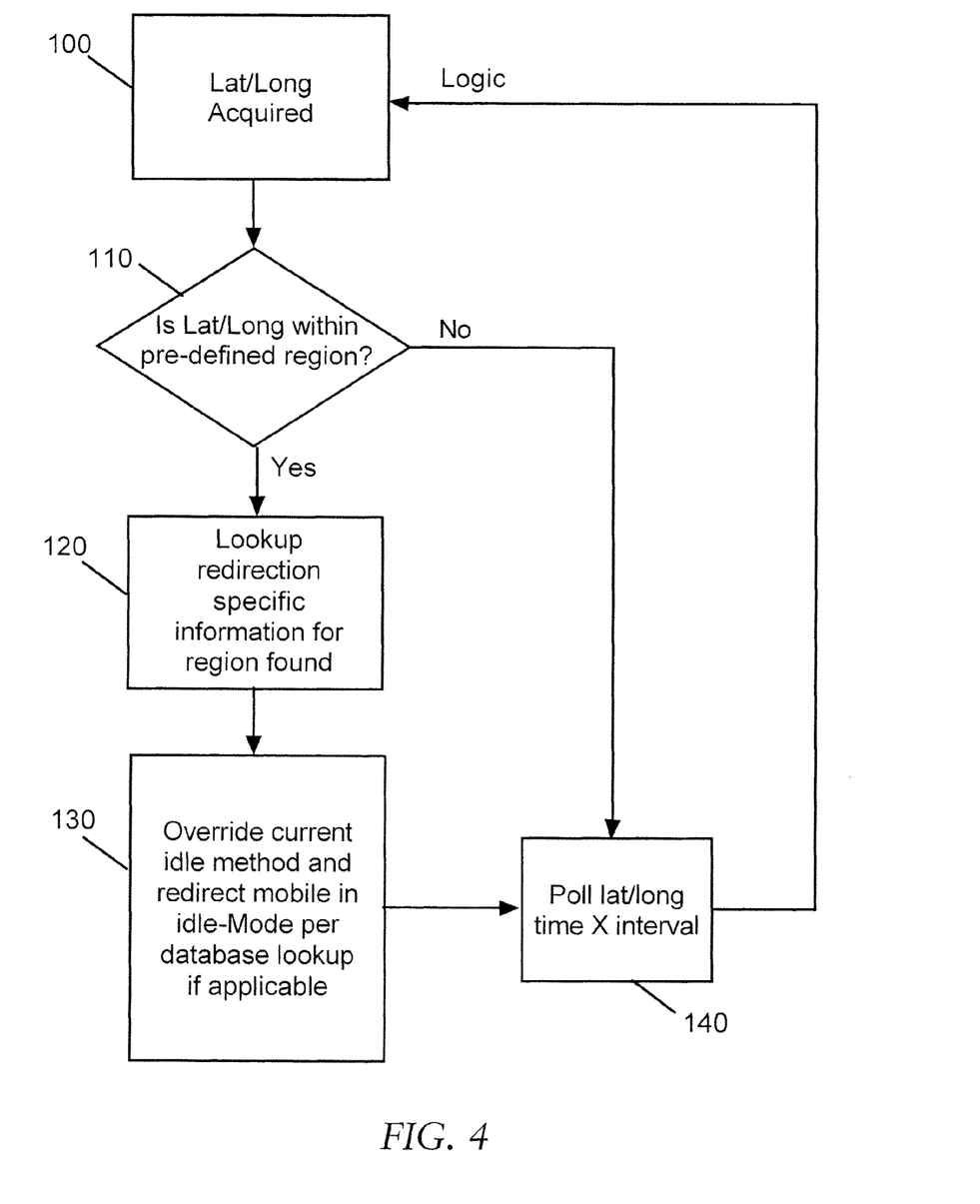
FIG. 4 is a flow chart outlining exemplary steps for determining the properly redirected channel.

FIG. 4 illustrates a flow chart of an example of the process by which the present invention performs a sector channel redirect. A mobile station 13 requests a geographic location and the microprocessor 51 then acquires from the GPS receiver 59 a geographic location, which in this example is a latitude and longitude. The acquisition of the geographic location can be done by accessing a last known geographic location stored in memory 53, taken within a certain time window of the request for the new acquisition, or the microprocessor 51 can request the GPS receiver 59 to take a new measurement. The microprocessor 51 then determines if the geographic location has been acquired (step 100). This determination can be based on whether or not the GPS receiver 59 can calculate a current geographic location, based on signal reception or number of GPS satellites 39 needed to complete a calculation. Additionally, it can be based on whether or not there is a recent geographic location stored that can be used.

Once the microprocessor 51 acquires the geographic location (lat/long) it accesses the spatial database 15 and determines if the geographic location is within a predefined polygon (step 110). A typical query compares the geographic location of the mobile station 13, with the geographic positions of the polygon 5, the geographic positions of the base stations 19 bounding a polygon 5, or the geographical areas or regions that define the polygon 5. The comparison can match geographic locations with geographic positions, or there can be an algorithm that computes the closest two geographic locations and positions without an exact match. Once the matching geographic locations and positions are determined, the spatial database 15 looks up if there is any specific information regarding redirecting channels (step 120). The microprocessor 51 then overrides the current channel and redirects the mobile station's 13 channel per the data supplied by the spatial database 15 (step 130). This step can be performed only when the mobile station 13 is tuned to the wrong channel or any time the command is given regardless of the channel the mobile station 13 is tuned to.

There may be multiple sectors that are matched in the previous step. If so, an algorithm can be designed to rank the sectors by proximity. The microprocessor 51 can then take the top ranked preferred sectors and provide those redirect instructions to tune to that channel. If the top ranked sector is unavailable, based on signal strength, the microprocessor 51 can go sequentially down a list of the ranked preferred sectors until a preferred sector channel can be successfully tuned.

Once the redirected channel is acquired per the above or the geographic location is not within a geographic position, the microprocessor 51 can restart the process (step 140). The process can be restarted after a specific period of time (per the illustrated example) or at any time the mobile station switched to idle mode.

In another example, periodically the mobile station 13 checks its geographical location. If the mobile station 13 finds that it is idling within a geographic area noted in the spatial database 15, the mobile station 13 redirects itself to the specified RF channel and idles there. The mobile station 13 can be set to scan for its location every X seconds. The scan rate and the spatial database can updated via over-the-air ("OTA") messaging.

Further, if the acquisition of the geographic location (in step 100) fails, either because of insufficient signal to the GPS receiver 59 or an aged previously determined geographic location, the microprocessor 51 then defaults to the prior art method of waiting for a redirect signal before switching channels.

In another example, the acquiring, determining, and look-up steps (steps 100-120) outlined above are all performed on the mobile station 13 without communicating with the mobile network 21.

Figure 5:
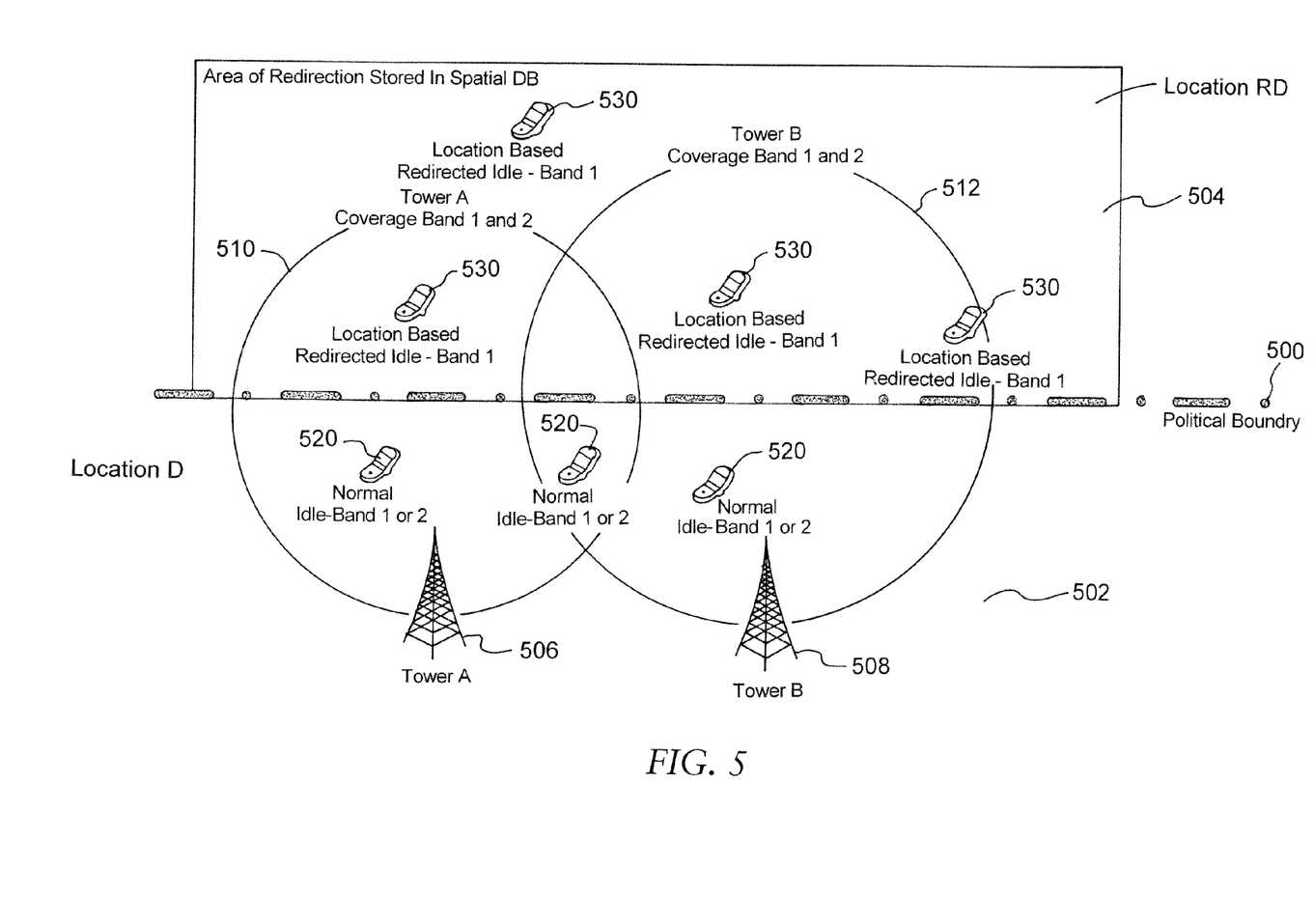
FIG. 5 is a simplified map showing multiple mobile stations and a boundary for the redirect signal.

FIG. 5. illustrates an example of why the invention is necessary in real world conditions. Political boundary 500 divides location D 502 from location RD 504. "Tower A" 506 and "Tower B" 508 are located in location 502 but service portions of location RD. Towers A & B 506, 508 can be serviced by the same base station or separate base stations. Both Towers 506, 508 cover two separate channels, band 1 and band 2, and Tower A 506 has a Tower A coverage area 510 and Tower B 508 has a Tower B coverage area 512. There are three mobile stations 520 inside location D 502 that can idle on ether band 1 or band 2 and do not require a frequency redirection. However, the four mobile stations 530 in location RD 504 do require a redirection since mobile stations in location RD 504 are required to be on band 1. Thus, the present invention allows mobile stations 530 to acquire their geographical location, and determine how that matches with the particular geographic position of location RD 502. The mobile stations 530 determine that there are redirection instructions for location RD 502 and once in idle mode, tune their channel to band 1.

This is better than the prior art method, since all mobiles on the redirected RF band 2 receive the redirection message, one or more of the mobile stations 520 in location D would also tune to band 1. This would leave band 2 underutilized and begin to over-tax band 1. The present invention allows only the mobile stations 530 that need to be redirected to be redirected to better service the bandwidth and comply with any rules set out by the locations 502, 504. In another common scenario, one of the mobile stations 530 in location RD 504 could have just crossed over the political boundary 500. If it was tuned to band 2 before crossing, and the redirect signal is not transmitted on band 2, the mobile station 530 cannot know to change channels. This can lead to dropped calls while the mobile station 530 is traveling within location RD 504. This decreases user satisfaction.

The present invention attempts to solve certain problems. For one, wireless capacity is maximized by keeping the mobile stations on redirection channel as long as possible. Capacity is retained in sectors that would otherwise be redirected. The redirections happen even if the mobile station is on a different channel or cannot receive a signal at the time. No RF signal is required for redirection to occur. Thus, the invention also increases the capacity of the network by utilizing part of the sector coverage of the redirector channel, that otherwise cannot be used effectively.

Another benefit is that the existing network RF footprint does not need to be modified to account for a location based redirection method. A mobile station utilizing location based redirection greatly reduces the risk of a failed call due to mistakenly idling in an intended redirection area. This allows finer control over areas to determine where a mobile station is when it is instructed to change channels and what channel they will idle on. Capacity at borders or by any geography can be gained by splicing a sector-channel for partial use. Thus, the RF network doesn't need be modified/compromised to implement the redirection method, it solely relies on geographic location.

Other benefits to the present invention is that very specific areas where multiple/complex redirection schemes are now possible since geographic boundaries can be drawn explicitly on a map and carved out by setting geographical positions in the spatial database. Mobile stations now will not accidentally idle on the wrong sector-channel when they really need to be redirected.

Other examples of the present invention is that the mobile can send its geographic location to the network and the network can communicate to the mobile station its location or the proper redirect channel based on the mobile station's geographic location.

As shown by the above discussion, functions relating to selection of the preferred sector channel by a mobile station to may be implemented in the form of programming and associated spatial database for controlling the relevant operations of the mobile station device. An example of the device has been discussed above relative to FIG. 2. The relevant software (programming and/or spatial database) may be downloaded and/or updated from a computer platform, for example, from an OTAF (Over-The-Air service activation/provisioning Function) server, or the like, communicating with the mobile station via the mobile network. Although special purpose devices may be used to support the download and update functions, such devices also may be implemented using one or more general purpose hardware platforms running appropriate programming. A host or other general purpose data processing device configured to perform as the OTAF might run "server" programming for the programming and list download functions, whereas the mobile station might run appropriate "client" programming for the complementary functions. Of course, the mobile station runs the programming to implement the preferred network determination functions, as discussed above, as well as to implement system selection and other location related features of the device.

As known in the data processing and communications arts, a general-purpose computer typically includes a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files of the spatial database providing position and/or boundary information of the mobile network sectors. The programming code is executable by the microprocessor 51 of the mobile station, e.g. from storage in the flash memory 53. For downloading and installation, however, the software is stored within the general-purpose computer platform or the like serving as the OTAF system.

Figures 6, 7:
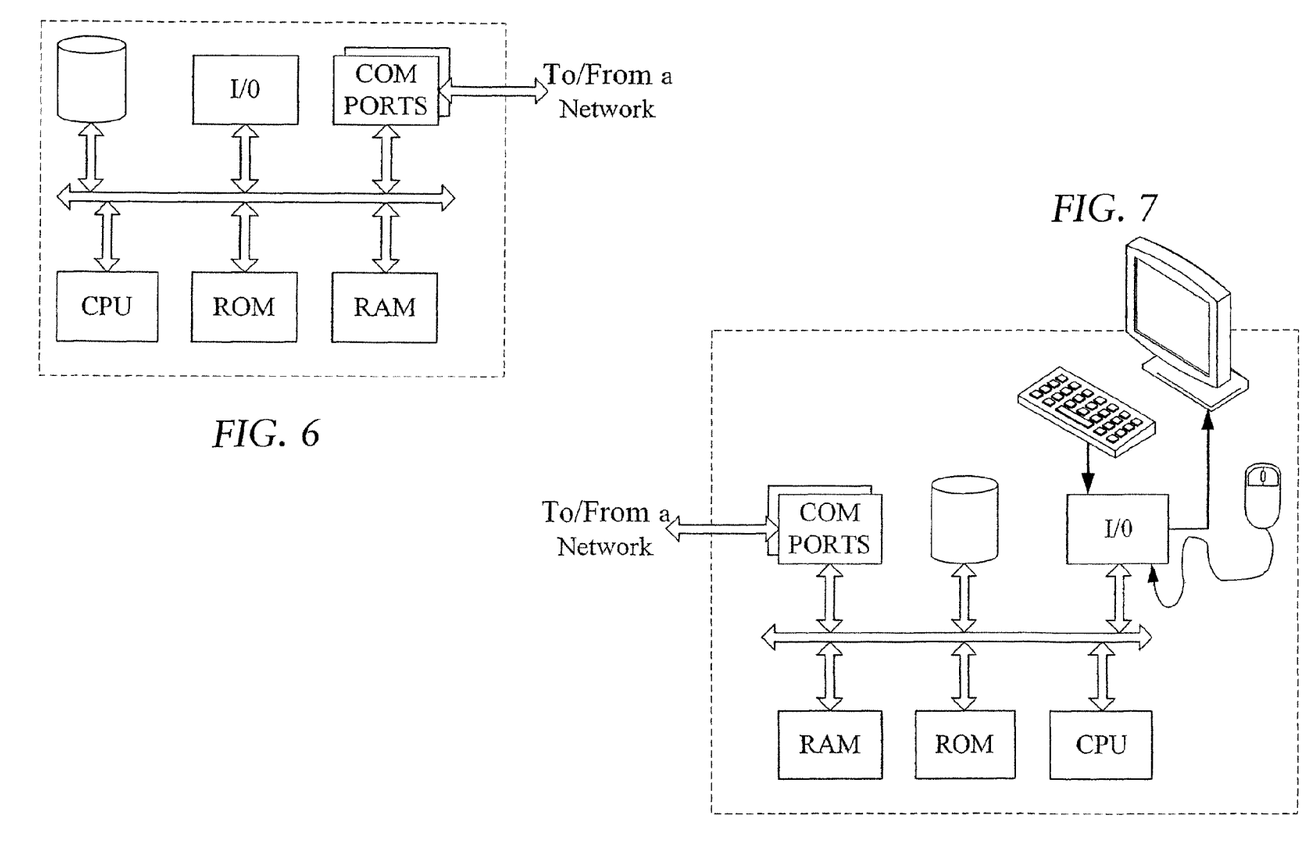
FIG. 6 is simplified functional block diagram of a computer that may be configured as a host or server.
FIG. 7 is a simplified functional block diagram of a personal computer or other work station or terminal device.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of mobile network selection outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software programming from a computer or processor into the mobile station, for example, from the OTAF server or other computer of the mobile network operator into the mobile station(s) of the operator's customer(s). Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A mobile station comprising:
   a location determination device identifying a geographic location of the mobile station;
   at least one mobile station antenna electrically linked to the location determination device;
   a mobile transceiver electrically linked to the at least one antenna, the mobile transceiver configured to transmit and receive mobile communication signals to and from a mobile network system divided into mobile network sectors via the at least one antenna;

a microprocessor electronically linked to the mobile transceiver to control the transmission and reception of the mobile communication signals and communicating with the location determination device; and a spatial database electronically linked to the microprocessor, and storing data identifying at least one or more geographic positions and geographic regions related to one or more of the mobile network sectors, wherein the microprocessor is configured to:
  determine that the mobile station has switched to an idle mode; and
  in response to determining that the mobile station has switched to the idle mode and independent of any communication signal of the mobile network system, start a process to compare the geographic location of the mobile station identified by the location determination device with the one or more geographic positions in the spatial database to determine a preferred channel of one of the mobile network sectors and redirect the mobile transceiver to the preferred channel; and
wherein at least one of:
  the location determination device:
    identifies the geographic location of the mobile station in response to determining that the mobile station has switched to the idle mode and prior to the determining the preferred channel of one of the mobile network sectors, and
    wherein the identification comprises taking a measurement of the geographic location of the mobile station in response to determining that the mobile station has switched to the idle mode;
  or
  the microprocessor in redirecting the mobile transceiver:
    determines whether the mobile transceiver is currently tuned to the preferred channel supported by the one of the mobile network sectors, and
    causes the mobile transceiver to tune to the preferred channel only upon determining that the mobile transceiver is not currently tuned to the preferred channel.

2. The mobile statin of claim 1, wherein the mobile transceiver is configured to be tuned to a RF signal based on the preferred channel.

3. The mobile station of claim 1, wherein the location determination device includes a Global Positioning System (GPS) receiver.

4. The mobile station of claim 1, wherein:
the location determination device is configured to identify the geographic location by latitude and longitude.

5. The mobile station of claim 1, wherein each entry in the spatial database identifying one of the plurality of geographic positions of a respective one of the mobile network sectors includes a series of geographical coordinates defining a boundary of the respective mobile network sector.

6. The mobile station of claim 1, wherein the mobile station does not connect to the mobile network system to determine the preferred channel.

7. The mobile station of claim 1, wherein a geographic coordinate for each position of a mobile network sector identifies a coordinate for the center of the sector area.

8. The mobile station of claim 1, wherein the microprocessor is further configured to:
determine whether the mobile transceiver is currently tuned to the determined preferred channel; and
cause the mobile transceiver to tune to the determined preferred channel only upon determining that the mobile transceiver is not currently tuned to the preferred channel.

9. The mobile station of claim 1, wherein the microprocessor is configured to start the process and determine the preferred channel every time the mobile station is determined to have switched to the idle mode.

10. A method comprising the steps of:
determining that a mobile station, operating in a mobile network system divided into mobile network sectors, has switched to an idle mode; and
in response to determining that the mobile station has switched to the idle mode and independent of any communication signal of the mobile network system, starting a process for location based roaming of the mobile station in the mobile network system comprising steps of:
  identifying a geographic location of the mobile station using a location determination device in the mobile station;
  wherein the mobile station stores a spatial database containing data identifying a plurality of geographic positions associated with a plurality of the mobile network sectors;
  retrieving, from the spatial database, data identifying a subset of the plurality of geographic positions of the mobile network sectors;
  comparing, with a microprocessor located in the mobile station, the identified geographic location of the mobile station to data identifying the subset of the plurality of geographic positions of the mobile network sectors;
  determining a preferred mobile network sectors, from the plurality of mobile network sectors, based on the comparison step;
  redirecting a mobile station transceiver to a channel supported by the determined preferred mobile network sectors; and
wherein at least one of:
  the step of identifying the geographic location of the mobile station:
    is performed in response to determining that the mobile station has switched to the idle mode and prior to the determining the preferred mobile network sector, and
    comprises causing the location determination device to take a measurement of the geographic location of the mobile station in response to determining that the mobile station has switched to the idle mode, or
  the redirecting the mobile station transceiver further comprises:
    determining whether the mobile station transceiver is currently tuned to a channel supported by the determined preferred mobile network sector, and
    causing the mobile station transceiver to tune to a channel of the determined preferred mobile network sector only upon determining that the mobile station transceiver is not currently tuned to a channel of the determined preferred mobile network sector.

11. The method of claim 10, further comprising the steps of:
upon a failure to acquire the geographic location, scanning, using the mobile station transceiver, a plurality of mobile network channels until an appropriate identifier is found;

tuning the mobile station transceiver to the mobile network channel having the appropriate identifier; and continually attempting the identifying step until the geographic location is acquired.

12. The method of claim 10, wherein the identifying, retrieving, comparing and determining steps are all performed on the mobile station without communicating with the mobile network system.

13. An article of manufacture, comprising:
instructions for causing a programmable mobile station to implement the steps of the method of claim 10; and
a non-transitory machine readable storage medium bearing the instructions.

14. The mobile station of claim 1, wherein:
the comparing the geographic location of the mobile station with the one or more geographic positions in the spatial database determines a set of the mobile network sectors; and
the microprocessor is further configured to:
rank the mobile network sectors of the determined set of mobile network sectors by proximity to the geographic location of the mobile station;
determine whether a signal is received from the top ranked mobile network sector on a channel associated with the top ranked mobile network sector; and
select the retrieved channel as an idle channel for the mobile station upon determining that the signal is received from the top ranked mobile network sector on the associated channel.

15. The mobile station of claim 1, wherein the microprocessor is further configured to:
receive an update for the spatial database via over-the-air messaging; and
update the spatial database based on the received update.

16. The mobile station of claim 1, wherein the microprocessor is further configured to identify the geographic location of the mobile station using the location determination device in response to determining that the mobile station has switched to the idle mode and prior to determining the preferred channel of one of the mobile network sectors.

17. The mobile station of claim 16, wherein the microprocessor causes the location determination device to take a measurement of the geographic location of the mobile station in response to determining that the, mobile station has switched to the idle mode.

18. The method of claim 10, wherein the microprocessor is configured to start the process and determine the preferred mobile network sector every time the mobile station is determined to have switched to the idle mode.

* * * * *